United States Patent [19]

Rockarts et al.

[11] Patent Number: 4,881,881
[45] Date of Patent: Nov. 21, 1989

[54] PLUG-RESISTANT ARCH-VENTS FOR A TIRE MOLD

[75] Inventors: Rene L. Rockarts, Northport, Ala.; Donald R. Bartley, Cuyahoga Falls, Ohio

[73] Assignee: The Uniroyal Goodrich Tire Company, Akron, Ohio

[21] Appl. No.: 153,179

[22] Filed: Feb. 8, 1988

[51] Int. Cl.⁴ ............................................. B29C 33/10
[52] U.S. Cl. .................................. 425/28.1; 249/141; 425/812
[58] Field of Search ................ 425/28.1, 812; 249/141

[56] References Cited

U.S. PATENT DOCUMENTS

| 1,880,430 | 10/1932 | Furnas | 425/28.1 |
| 4,023,268 | 5/1977 | Momchilov | 425/28.1 |
| 4,708,609 | 11/1987 | Yoda et al. | 425/812 |

FOREIGN PATENT DOCUMENTS

| 231619 | 2/1964 | Austria | 425/812 |
| 54-69191 | 6/1979 | Japan | 425/812 |
| 435948 | 11/1974 | U.S.S.R. | 425/28.1 |
| 1235231 | 6/1971 | United Kingdom | 425/28.1 |

*Primary Examiner*—James Housel
*Attorney, Agent, or Firm*—Alfred D. Lobo; Alan A. Csontos

[57] ABSTRACT

A split tire mold having a tread ring having arch-vents for venting air circumferentially across the inner surface of the tread ring so that air escapes from the parting line of the mold halves. The "dougle-wedge-shaped" arch-vents provide passage for trapped air above each tread block of the tread as it is moved against the inner surface of the tread ring. The shape of the arch-vent passages and the angulation of the wedges is critical to the effectiveness of the arch-vent which forms an arch-vent bridge of cured rubber in a cured tire. The configuration of the bridge allows a cured tire to be easily removed from the mold cavity without leaving a broken-off piece of the rubber bridge to plug the arch-vents. This arch-vent design leaves flat-sided, narrow wedge-shaped pieces of rubber as the arch-vent stubs, tapered in two directions. The arch-vent stubs, viewed in the radial direction are so unobtrusive as to be cosmetically acceptable in a finished tire. The upper surface of the arch-vent is close to the inner surface of the tread ring and essentially horizontal, while the lower surface of each arch-vent is inclined at an angle in the range from 30°–50° to the horizontal plane, but in opposite directions. An angle in this range provides strength in the base area of the arch-vent stub so that, upon stripping the tire from the mold, the arch-vent bridge of cured rubber breaks cleanly and reliably at the narrowest and weakest point in the bridge.

4 Claims, 2 Drawing Sheets

PLUG-RESISTANT ARCH-VENTS FOR A TIRE MOLD

BACKGROUND OF THE INVENTION

In a typical curing press, a tire is cured in a mold cavity in which the green (unvulcanized) tire is biased against a metal tread ring by a curing bladder at elevated pressure and temperature, for a time sufficient to cure the tire. The tire is placed in the curing press so that the vertical axis coincides with the axis of rotation of the tire. In other words, the tire in the mold cavity lies in the horizontal plane. The mold cavity is provided with a tread ring which has generally horizontal and transverse (inclined to the horizontal) rib elements (ring ribs), forming circumferential ring ribs disposed on the inner circumferential surface of the tread ring. These rib elements project radially inwards, that is, towards the center of the mold cavity, for a predetermined depth which determines the depth of tread in the tire to be cured. The rib elements are in spaced-apart relationship which provides tread blocks of preselected size and pitch sequence in the tread design of the tire being cured.

It is essential to vent the air which would otherwise be trapped between the inner surface of the tread ring and the radially expanding surface of the green tire as it is being biased towards the tread ring. Heretofore, this air has been vented radially with radially extending passages (radial vents), as well as with vertically (relative to the plane in which the tire is being cured) extending vents, referred to as "cross-vents" in the prior art, and referred to as "arch-vents" herein. The vents place the mold cavity in open communication with an annular vent space between the outer surface of the tread ring and the inner surface of each mold half. A passage places the annular vent space in open communication with the atmosphere, thus venting trapped air.

In the typical configuration of radial vents, each vent has a conical shape, the base having a slightly larger cross section than the apex, so that upon curing of the tire, a cone of rubber (vent stub) is formed in the vent. The vent stub is of sufficient diameter so that, upon removal of the tire from the mold cavity by a vertically upward tire-stripping force, the base of each vent stub is large enough to pull the entire vent stub from the vent without allowing the vent stub to break off in the vent.

The slighter the taper of a vent stub, the more difficult it is to predict just where a break will occur. The larger the base of the vent stub, the greater its strength, and the less likely will it be that the vent stub will break off in the vent. Most breaks occur near the base, because of the initial shearing force at the inner surface of the tread ring, when the cured tire is stripped from the mold cavity. Since the upward force to strip a tire in a press, whether an AUTOFORM or BAG-O-MATIC type press, is essentially fixed by the stripping mechanism associated with the piston of each press, the problem was to provide a venting means (vent, or passage) with a configuration which would result in the formation of as inconspicuous and unobtrusive a narrow bridge (vent bridge) of rubber as possible, yet strip the narrow and small bridge so formed in a conventional curing press, without breaking the bridge at any point other than its narrowest and weakest point, preferably its mid-point.

The strength of a vent bridge, just prior to stripping the tire also depends upon the thermal history of the vent bridge, and in particular, the temperature gradient in the tread ring at that time, which gradient determines the temperature profile along the radial length of each side of the bridge. When the tire is stripped, the bridge is broken, resulting in the vent stubs which are to remain in the finished tire. Since this temperature profile is not the same for every bridge in the cured tire about to be stripped, the relative strengths of the bridges in different portions of the tread ring is not equal.

The effect of temperature on the hot cured elastomer makes it difficult to calculate the effect of the various forces on the sides of the bridge during stripping. Therefore the practical effects of shearing forces were measured by arduous trial and error. Since the force required to strip a tire from the mold is so large, the particular very small dimensions of each side of the vent bridge first seemed to be irrelevant with respect to where the bridge would break. Most particularly, it seemed that whether the force acted on a bridge end with a cylindrical cross-section, or whether that cross-section was rectangular, or any other geometry, would be immaterial.

Eventually, we were surprised to find that the direction of the shearing force was the overriding factor, and that the height of the stub (in the horizontal direction, measured along the radius of the tire) at the bridge's ends determines it strongest section, where it will not break, much more so than the width (thickness, measured in the vertical plane, that is, normal to the horizontal plane in which the mold lies).

It is self-evident that if there is a single vent for a tread block, any vent stub broken off in the vent so as to plug it, would negate venting the tread block formed behind the vent, resulting in blemishes or bubbles in the surface of the tread block. Therefore every vent stub, whether a radial vent stub or a cross-vent stub, must be pulled out of the vent passage without leaving a plug. Since each tread block on a tire must be vented, there is at least as large a number of vent stubs on a tire as there are tread blocks, and the probability of a broken vent stub begins to weigh against reliable and effective vent stub removal.

Even when conventional radial venting is effectively executed, with stubs of sufficient basal strength, the cured tire removed from the curing press must be de-stubbed in a later operation before the tire is cosmetically acceptable when sold. This necessary operation is both time-consuming, expensive and wasteful. The larger the diameter of the vent, the larger the vent stub, and the less visually appealing is the dressed surface of the tire; also, the more the waste of rubber, since cured vent stubs dressed from a cured tire, have no economic value.

The mounting economic pressure of the market place has, over the years, led tire mold designers to vent a tire without resorting to radial vents. Since it is essential that the circumferential surface of each tread block formed within the confines of the ring ribs, be smooth, that is conform exactly to the inner surface of the tire ring, they used "cross-vents" to avoid dressing the cured tire, and to minimize the waste of rubber. These cross-vents place the spaces above each of the tread blocks within the confines of ring ribs, in open communication with each other, so that air trapped in these spaces is progressively flowed towards the lateral circumferential center-line of the molds where the parting line affords escape to the atmosphere.

The difference between the design requirements of a radial vent stub and a cross-vent stub are similar only to the extent that each seeks to provide effective venting of trapped air with the smallest vent passage practical. The difference in the design requirements is that a cross-vent bridge must break at a predetermined location with just a single break, while radial vent stubs must not break at all. The cosmetic requirements of the marketplace require that radial vent stubs be removed, that is, cured tires must be de-stubbed, while cross-vent stubs are not removed provided they are relatively unobtrusive and maintain a smooth upper tread surface.

Cross-vents are drilled, cylindrical, slightly tapered passages which provide the necessary venting. The tread blocks in the cured tire are therefore bridged with a bridge having a narrowed mid-section, and, cylindrical, slightly tapered sides of cured rubber, just before the tire is stripped. When the tire is stripped from the mold, this bridge is broken at its weakest point. As with the radial vent stubs, the cross-vents have enlarged bases with a cylindrical cross-section, so as to provide a tapered cross-vent stub which will have sufficient basal strength to break the bridge without leaving a portion of it to plug the cross-vent. The weakest point in the bridge is determined not only by the geometry of the rubber-bridge but by the thermal history of each side of the bridge.

Since the geometry is the controlling factor, whether in a radial vent stub or with a cross-vent bridge, the larger the base, the less likely was the cross-vent stub to break off near the base, or in more than one location in the bridge, so as to leave a plug in the cross-vent. However, since the broken cross-vent bridge is to be left in the finished tire to attempt to make the bridge-portions as unobtrusive as possible for cosmetic reasons, it was essential to keep the bases of the cross-vent stubs as small as possible. This resulted in accepting a greater risk of plugging the cross-vents. Predictably, with the exigencies of high quality control standards required to be maintained economically, the resulting frequency of plugging became unacceptable. The conical cross vents in tread rings currently used, have failed to solve the problem of plugging due to the cross-vent bridge breaking off unpredictably.

It is self-evident that the cross-vent bridge must break cleanly at a single break-point in the bridge, so as not to leave a portion to plug the vent. It is also self-evident that simply increasing the diameter of the vent passage may increase the force required to break each cross-vent bridge, but it becomes progressively less unobtrusive, and because there is little directional bias for the shear (force) on a cylindrical base, its enlarged diameter provides little assurance that more than one break will not occur, thus leaving a plug in the cross-vent.

The difficulty in coping with the problems of using cross-vents has resulted in tire mold designers opting to vent the mold cavity radially, with concealed tire vents, so as to minimize the de-stubbing required to finish a tire, as for example in U.S. Pat. Nos. 3,553,790 and 3,692,090 to Brobeck et al, and still more recently in U.S. Pat. No. 4,436,497 to Dahl et al. The unique "butterfly-shaped" or "double-wedge-shaped" design of our cross-vent, referred to herein as an "arch-vent", not only provides effective venting and leaves a finished tread surface free of radial vent stubs, but does so reliably and reproducibly, assuring that each arch-vent bridge will break at its weakest point, near its midpoint, and not leave a plugged arch vent when the tire is stripped. Moreover, arch-vent stubs provide improved traction in mud and snow, attributable to the stiffness imparted to the stubs because of their wedge shape; an advantage not shared by conical prior art cross-vent stubs.

SUMMARY OF THE INVENTION

It has been discovered that air trapped in a tire mold may be vented across the inner surface of the tire ring through flat-sided and narrow, tapered "butterfly-shaped" or "double-wedge-shaped" cross-vents which, upon the tire being cured, produce a double-wedge-shaped bridge of cured rubber bridging adjacent tread blocks. Upon being stripped from the mold by an upward force, the bridge breaks at its mid-point producing wedge-shaped arch-vent stubs which protrude unobtrusively from the tread blocks.

It is therefore a general object of this invention to provide a vented tire mold of the type having a mold body provided with a tire-receiving cavity and rib means to produce a preselected tread pattern, the rib means having a double-wedge-shaped arch-vent means near the inner circumferential surface of the mold cavity, for venting trapped air above the outer surface of an expanding green tire in the initial stages of the curing cycle in a conventional curing press.

It has more specifically been discovered that a double-wedge-shaped arch-vent no more than about 0.065 in. (inch) wide at its mid-point, with opposite sides having lower surfaces angled upwards (towards the inner surface of the tread ring) at an angle of from 30° to 50°, forms an arch-vent bridge having sides at least 0.15 in. high, which provide enough strength to ensure that the bridge will have only a single break near its mid-point.

DETAILED DESCRIPTION OF THE PREFERRED EMBODIMENT

Figure 1:
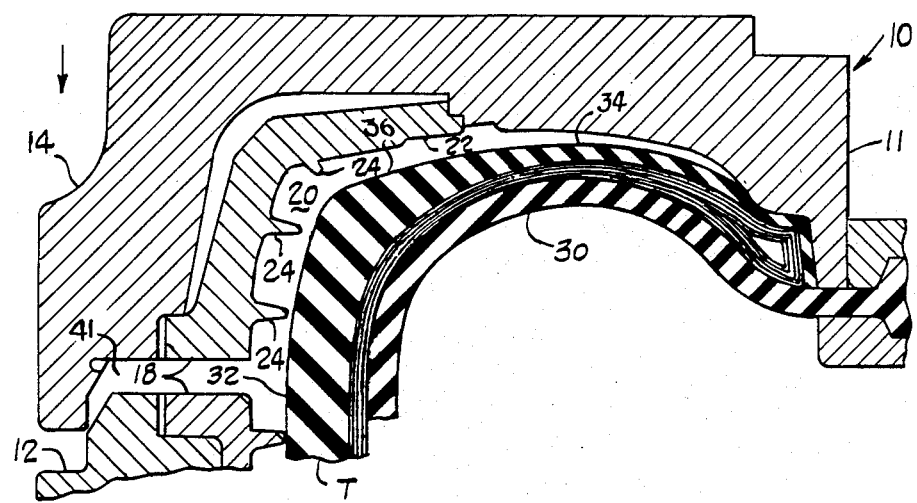
FIG. 1 is a partial cross-sectional view of a tire mold embodying the invention.

In the drawing, and particularly in FIG. 1, there is shown a schematic representation of a tire mold indicated generally by reference numeral 10, the body 11 of which mold includes a lower mold half 12 (only a small portion of which is shown) and an upper mold half 14, a much larger portion of which is shown in transverse cross-section. The upper mold half 14 is shown in a position just prior to its full engagement with the lower mold half 12 as the former moves downward, in the direction indicated by the arrow, into the closed position of the mold 10. The upper mold half and lower mold half each include a half of tread ring 18, which is an aluminum casting extending circumferentially within the circular mold and each of which tread ring halves is seated in its respective mold half to become a part of the mold body 10.

The mold halves 12 and 14 define a tire receiving mold cavity 20. Extending radially inwardly from the inner tire engaging surface 22 of the tread ring 18 are a plurality of circumferential tread ring ribs 24 and 24' which are formed as integrally cast parts of the tread ring 18 and which engage the uncured tire T to form generally circumferential grooves, forming tread blocks in the tread of the tire. The ribs 24 and 24' (see FIG. 2) extend in the lateral and transverse directions in the upper surface of the tread ring, so that adjacent ribs 24 and 24' combine to form a tread block zone in which a portion of the tread is confined to form a tread block. The lateral and transverse ring ribs 24 and 24' form lateral and transverse channels or valleys 25 and 25' (also referred to as grooves and indentations) respectively, in the tread, which are part of the tread design.

In a conventional curing cycle, the green tire carcass T is expanded by a pressurized curing bladder 30 so that the green tire fills the mold cavity. When this is done, the outer surface 32 of the tire first makes contact with the innermost surfaces of the circumferential ribs 24 and 24' thereby entrapping air between the tread ring's inner surface 22 and the surface 32 of the tire. All of this air, so trapped, must be vented outside the mold before the outer surface of the tread contacts the inner surface of the tread ring if the cured tire is to have a bubble-free tread surface.

Figure 6:
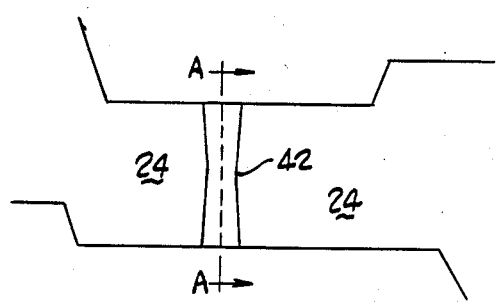
FIG. 6 is an enlarged plan view of a ring rib showing the arch-vent after the ceramic insert is removed.

The cross-sectional area of the arch-vents must together provide sufficient area to allow air from within the tire to find its way to the parting line 41 of the mold halves within the time required for the outer tread surface to contact the inner surface of the tread ring. This time is typically from 5 sec to about 20 sec after the shaping stage of the curing cycle is completed. In practice, each tread block is vented through at least one, and preferably two arch-vents each having a throat 42 (see FIG. 6) intermediate its open ends. The combined cross-sectional area of the throats is sufficient to vent the mold before the outer surface of the tread contacts the inner surface of the tread ring. The mold is vented to the atmosphere from the parting line 41 which provides a convenient exit for the trapped air to be so vented.

The trapped air is flowed from near the sidewall 34 of the tire, past the shoulder 36, and thereafter through the arch-vents 40 (see FIG. 2) provided only in the lateral ribs 24, flowing across the outer surface 32 of the tire, before the air is vented through the parting line 41 of the mold. The shape of the arch-vent 40 is adapted to vent a large mass of air, yet form an arch-vent bridge with an unobtrusive width (viewed in plan view, looking to the center of the tire from above the tread). If the air nearest the sidewall is not vented before the tire is expanded into a position against the inner surface of the tread ring, the air will be trapped. Therefore, it is essential that the tire, the mold cavity, and the curing bladder be so designed that the sidewall of the tire is biased first against the inner surface of the mold cavity, then the shoulder, and finally the tread, so that no air is trapped in the sidewall, or any other area above the tread surface.

Clearly, since the last of the trapped air will be very close to the inner surface of the tread ring, it is desirable to place the arch-vents as close to that surface as practical. From the foregoing design considerations it thus becomes evident that effective venting of the mold cavity would require a large number of very small arch-vents machined, or otherwise formed, in each circumferential tread ring rib, very near its base (where it meets the inner surface of the tread ring). The physical difficulty of putting the theoretical requirements of the invention into practice could only be overcome with persistence involving a far greater than ordinary devotion to the type of trial and error one skilled in the art might be expected to invest in the task.

In the past, the emphasis on providing visually unobtrusive cross-vent stubs (also referred to as lateral or bridge stubs) has resulted in cross-vents with as small a vent diameter (minimum throat area) as would allow the trapped air to be vented within the time required for the tread of the expanding tire to be seated against the inner surface of the tread ring. Though this permitted crossvents of small cross-section, they were prone to being plugged. Enlarging the size of the cross-vents alleviated the problem but a width greater than about 0.1" (2.54 mm) was visually unacceptable. Moreover, it was difficult to accommodate the larger circular cross-section of the ends of the cross-vent stubs in the restricted space of a channel.

Since the goal remained the same, namely, to provide unobtrusive arch-vent stubs which can be left in the finished tire when the arch-vent bridge is broken only at its narrowest cross-section, each arch-vent was still to have as small a cross-section, that is, be as narrow as practical, yet not so small that the arch-vent would have a proclivity to plug. Further, though one could provide the necessary minimum throat area between adjacent tread blocks in a single arch-vent, if such a single vent was provided, the cross-sectional area of the throat (or equivalent diameter) would be too large to leave unobtrusive arch-vent stubs on the tread blocks. Moreover, if there is but one vent per tread block, and it plugs, the mold will produce defective tires until the plug is removed.

To cope with both problems, it is desirable to subdivide the vent area, and provide plural arch-vents in the ribs 24 between tread blocks, except of course, that it becomes physically more difficult to do so by conventional casting techniques, and the smaller the arch-vent the more susceptible it is to being plugged with very small pieces of rubber, irrespective of the origin of such pieces.

Where cross-vents have been used in a tire mold in the past, they comprised opposed cone-shaped passages, forming a throat intermediate the open ends, the base of each of cone-shaped passage being much greater in diameter than the width (measured circumferentially in the direction of a ring rib) of the throat. Such relatively greater diameter was necessary to prevent the conical cross-vent stubs from suffering plural breaks, or breaking near their bases. Typically a cross-vent bridge would have oppositely directed conical vent-stubs, each with a base about 0.125" (3.175 mm) tapered to an apex expected to be the weakest point in the bridge. The apexes of the opposed conical vent-stubs formed a throat with a cylindrical passage vents of such dimensions were more than adequate to vent the air from the mold cavity, and were relatively unobtrusive, they broke unpredictably, not only at an unpredictable location, but in an unpredictable number of fragments.

Figure 2:
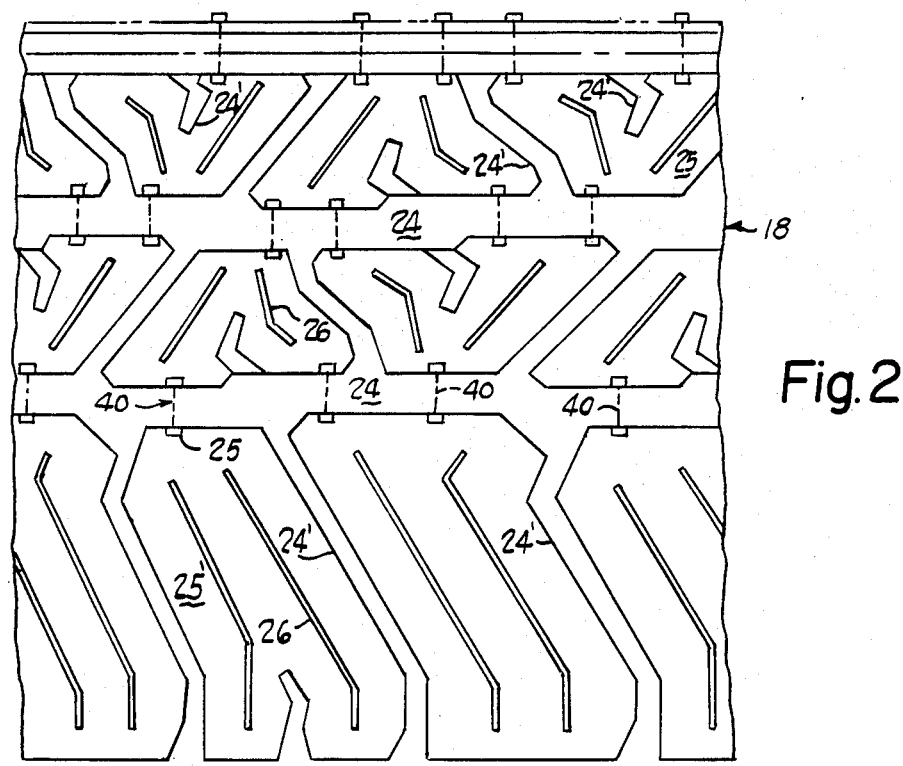
FIG. 2 is a diagrammatical representation of a tread ring, from within the tire mold, looking outward, showing some arch-vents in tread ring ribs in a mold for a tread design shown in Ser. No. 813,177, filed Dec. 12, 1985, now abandoned, the disclosure of which is incorporated by reference thereto as if fully set forth herein.

There is shown in FIG. 2, a representative portion of the tread ring 18 in which the arch-vents 40 are formed by having the aluminum tread ring cast around a multiplicity of ceramic arch-vent inserts indicated generally by reference numeral 50 (FIG. 3) which are then removed to leave the double-wedge-shaped arch-vents 40.

In a specific instance, a tread made with a conventional tread compound for a radial P215HR15T/A$^R$ tire, the tread pattern for which, is disclosed in U.S. Ser. No. 813,177, now abandoned, was provided with conventional oppositely directed double cone-shaped cross-vents having a base diameter of 0.065" and tapering to 0.05" at the mid-point of the cross-vent having an overall length (between adjacent tread blocks) of 0.61". The tread ring was then set in a tire mold and tested in a curing press using a curing cycle, and stripping force, conventionally used for a radially vented tread ring. The tread ring was examined periodically, particularly if any cured defects were visually observable in the tread of a cured tire. After every 100 heats (curing cycles), the mold was removed and individual cross-vents in the tread ring were checked with a narrow beam of light to determine to what extent they were plugged. It was found that 25% of the cross-vents were plugged with portions of broken-off cross-vent bridges. The number of defects in the cured tread did not reflect the large number of plugged cross-vents because, if only one of two cross-vents in a tread block was plugged, the other would adequately vent the block.

The mold was then fitted with a tread ring for the same tread pattern, except that arch-vents were substituted for the cross-vents. The dimensions of the arch-vent inserts were as follows: length E (across the tread ring rib) 0.610"; width F of each flattened end portion 0.085", width H of the base 0.065"; diameter J of the throat (at mid-point of arch-vent) 0.050"; lower surfaces 55a and 55b (FIG. 4) of each wedge angled upward at 45°; upper surfaces 56a and 56b of each wedge angled downwards at 5°; so that, in plan view looking to the center of the tread ring from outside the tread, the width of each arch-vent stub at its base 54a or 54b (the widest dimension visible in plan view), formed with the insert 50, is essentially the same as the base diameter of the conical cross-vents used in the prior art.

The mold was then tested by placing it in a curing press, and tires of the same tread design, and treaded with the same rubber compound, were produced in a conventional production cycle. The mold produced a succession of 3000 defect-free (due to plugging of the arch-vents) in as many curing cycles, after which the mold was routinely removed for periodic maintenance accorded molds which have completed a "full cycle" of 3000 curing cycles. An examination of the mold with the light beam indicated that not a single arch-vent was plugged. The arch-vent bridges do not break-off as frequently as the prior art cross-vents, if at all.

Figure 3:
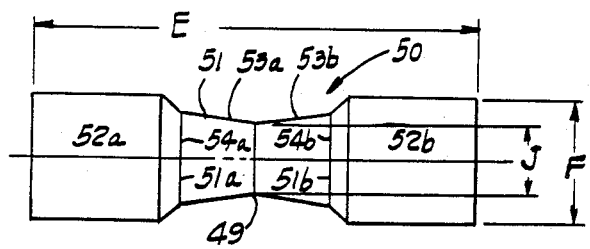
FIG. 3 is an enlarged plan view showing a dumb-bell shaped (viewed from above) ceramic arch-vent insert, around which molten metal is to be poured to mold the tread ring.

As shown in the enlarged plan view FIG. 3, the arch-vent insert 50, viewed from above, has a dumb-bell shape, comprising a double-wedge-shaped bail indicated generally by reference numeral 51, including opposed wedge-shaped portions 51a and 51b each having sides 53a and 53b tapered slightly inwardly, preferably about 5° to 15° in the horizontal direction toward the mid-point, connecting flat-sided end portions 52a and 52b. The taper of the sides is not narrowly critical, the taper being provided to facilitate stripping of the tire. The width (viewed in plan view looking to the center of the tread ring from outside the tread), of the bail 51 of an arch-vent insert is in the range from about 0.040 inch at its mid-point, increasing to less than 0.1" (2.54 mm) at its opposite bases 54a and 54b where the bases meet the end portions 52a and 52b. The dimensions of the arch-vent bridge of cured rubber, which bridge is formed just before the tire is to be stripped from the mold, are determined by those of the bail 51, and it will now be evident that a thickness (width) of elastomer, particularly black rubber, having the dimensions of the bail 51, when viewed in plan view against a background of the black rubber tread, is barely visually noticeable unless the tread is scrutinized.

The width (viewed in plan view looking to the center of the tire) of an end portion 52a or 52b of the ceramic insert is in the range from about 0.065 to about 0.090" (1.65–2.28 mm). The overall length of the ceramic arch-vent insert is typically less than 1" (2.54 cm) and its width at its midpoint, the narrowest portion, is typically about 0.050" (1.25 mm), so that it provides satisfactory venting for a large mass of air, yet the insert can be handled and positioned, with due care, in a form for casting the tread ring. It will be evident that an insert 50 will preferably be symmetrical, so that the arch-vent is formed with the throat 42 at its mid-point, but the function of the arch-vent will be met even when the throat is intermediate the open ends of the arch-vent, and not at its mid-point.

Figure 4:
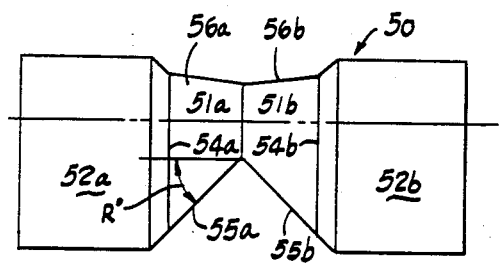
FIG. 4 is a front elevational view showing the double-wedge shape of the ceramic arch-vent insert of FIG. 3.

Referring now to the front elevational view of the insert shown in FIG. 4, it is seen that the bail 51 has a double-wedge shape comprising wedge-shaped portions 51a and 51b in mirror-image relationship about the vertical axis of FIG. 4, with their apexes overlapping the vertical axis at the midpoint of the bail 51. The base 54a of wedge-shaped portion 51a is of a length such that the lower surface 55a is inclined to the horizontal (in FIG. 4) at an angle R in the range from about 30° to 50°. The angle R in this range is such that it allows easy stripping of the tire and at the same time provides a strong base to withstand the vertical shear force when the tire is stripped. The angle R also allows the exertion of a very high shear at the narrowest point, where the cross-section is smallest, typically at the mid-point of the arch-vent bridge so that when the tire is stripped, the bridge will break along its (vertical) mid-centerline.

The upper surface 56a of wedge-shaped portion 51a is slightly downwardly inclined, preferably sufficiently to provide a taper of from 5° to about 20° in the vertical direction, to the center of the upper surfaces 56a and 56b of the wedge.

Wedge-shaped portion 51b is preferably a mirror image of the portion 51a, its base 54b being of a length such that its lower surface 55b has the same inclination to the horizontal as lower surface 55a of portion 51a, except in the opposite direction. As shown in the FIG. 4, the base 54a is connected to a beveled portion (beveled with the same angle as that of the inclination of lower side 55) of the end portion 52a because of the slight downward inclination of upper surface 56a. Each wedge-shaped portion is thus provided with upper surfaces tapered downwardly, and lower surface tapered upwardly, in opposite directions to the vertical. As described hereinabove, each wedge-shaped portion is also provided with side surfaces tapered inwardly, in opposite directions to the horizontal. Thus, both portions 51a and 51b of the bail 51 are tapered in both the horizontal and vertical directions, towards the midpoint of the bail, hence "double-wedge-shaped".

Figure 5:
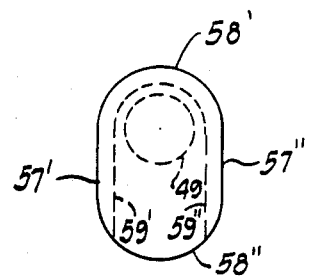
FIG. 5 is a side elevational view of the ceramic insert shown in FIG. 4.

Referring now to FIG. 5, there is shown an end view of the insert shown in FIG. 4, showing the flat sides 57' and 57", and half cylindrical upper 58' and lower 58" surfaces of the end-portions 52a and 52b; and, the flattened (and tapered) sides 59' and 59" of the wedge-shaped portions 51a and 51b, tapered to the midsection of the insert which has a cylindrical cross-section 49. The cross-section of the midsection of the insert is not critical, it simply being more convenient to provide a cylindrical cross section and to smooth the sides 53a and 53b to flatten as they form bases 54a and 54b at their respective end-portions. What is critical is that the throat 42, formed by the mid-section 49, provide at least the minimum vent area required to vent a tread block zone in the required time. When the tire is stripped from the mold, the wedge-shaped portions of rubber are formed with the same configuration as the wedge-shaped portions 51a and 51b of the ceramic arch-vent insert.

The arch-vent insert is secured in a slot in a master pattern for the mold (not shown) so that when the tread ring 18 is cast of molten metal, the molten metal surrounds the insert. Typically a ceramic composition is used, which can be washed out of the mold after it is cooled, as is conventionally done in this art of casting aluminum. When the insert is dissolved, it leaves the arch-vent 40 in the rib 24. Other methods for forming the arch-vents may effectively provide a similar configuration, provided the angle R of the lower sides, can be controlled. However, it will be apparent that the flattened configuration of the dumb-bell is best provided by molding the tread ring around an arch-vent insert as described.

It will now be evident that when there are more than four ribs in each mold half, it is critical that the air trapped near the sidewalls 34 be expelled first. To do this, expansion of the uncured tire T is controlled so that air in the mold, from zones farthest from the parting line, has time to flow to the parting line. If there are more than four ribs in each half, it may be desirable to provide radial vent stubs in the first row of tread blocks near the shoulder 36 of the tire.

Figure 7:
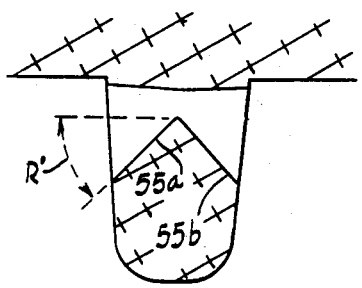
FIG. 7 is a front elevational view showing the double-wedge shape of the arch-vent of FIG. 6.

Upon removal of the ceramic insert 50 from the mold, a double-wedge-shaped passage with flattened sides and upper and lower surfaces, all tapered towards the midpoint of the passage, is formed in the tread ring ribs 24. Viewed in plan view, shown in FIG. 6, though the passage appears to be of substantially uniform width, it is slightly tapered towards its mid-point. Viewed in an elevation view looking towards the line A—A, the double-wedge-shape of the passage is evident, as shown in FIG. 7, indicating that the height of the passage away from its mid-point, is substantially greater than its width. The upper and lower surfaces are half-cylindrical and the sides flattened, corresponding to the shape of the insert, as described in FIG. 5 hereinabove.

As will now be evident, the cured tire will have arch-vent bridges of cured rubber between adjacent tread blocks. When the tire is stripped from the mold, the angle R provides the wedge-shaped portions of cured rubber with sufficient strength to break the arch-vent bridge of cured rubber at, or very near its midpoint, where it is weakest, and allows the wedge-shaped portions to be removed from the tread ring, otherwise undamaged. Scrutiny of the tread surface will show wedge-shaped protrusions, slightly spaced apart (because of the break) from each other, on adjacent tread blocks on each side of a lateral channel or valley formed in the tread by a lateral tread ring rib 24.

It will also now be evident that the tire mold we have provided will yield arch-vent stubs which may be satisfactorily removed from the mold only if the arch-vent stubs are designed with bases within the range of limitations of angle R and sufficient cross sectional area of the throat of the arch-vent to allow trapped air to be vented within a preselected period of time required to seat the outer tread surface against the inner surface of the tread ring. In this way, not only is trapped air vented, but the stripping force required for removal of the tire will insure that there is only a single break at the mid-point of each arch vent bridge formed when the tire is cured.

Furthermore, the curing cycle of the tire is desirably adjusted so that expansion of the green carcass into the mold cavity is controlled so that the time required for the surface of the tread to be seated against the inner surface of the tread ring is in the range from 5 to 20 sec after the shaping stage of the curing cycle is completed. Finally, the bladder is preferably designed so that the green carcass is expanded, first, against the sidewalls of the mold cavity, so that the carcass gradually fills the circumferentially mid-portion of the cavity.

Having thus provided a general discussion, and a specific illustration of the best mode of the present invention, and described the method of making a tire with arch-vents, one skilled in the art will appreciate that in addition to the economic benefit derived from not having to de-stub a cured tire, the arch-vents of our invention provide a functional benefit, namely of improved traction in snow, and an anti-hydroplaning effect, both of which characteristics are an asset for a tire not specifically designed either for traction in snow, or for traction on wet roads. This is particularly remarkable because these benefits are obtained without any noticeable increase in tread noise.

It will also be appreciated that the ease with which the tire mold is fully vented depends upon the flow of trapped air to the parting line of the mold. The more the number of ribs in each half of the mold, the more care is to be exercised in the design and construction of the mold, to make sure the air will be completely vented. The problem of venting is more easily addressed in a vacuum tire mold. Where there are several ribs on each side of the parting line, a conventional non-vacuum mold may benefit from radial venting of the shoulder areas, in addition to the arch-vents.

We claim:

1. In a vented tire mold having a mold body provided with a tire receiving cavity, and with means for producing a preselected tread pattern with a tread ring having lateral and transverse ribs which are provided with arch-vents, each lateral rib having an ar-vent placing individual tread-block forming zones in open communication one with the other, the improvement comprising, each said arch-vent being double wedge-shaped and comprising opposed wedge-shaped passages connected at their apexes formed by downwardly inclined and upwardly inclined upper and lower surfaces, respectively, each lower surface of each wedge-shaped passage being upwardly inclined at from 30° to 50° relative to a longitudinal axis of said vent, so as to form, with said downwardly inclined upper surfaces, a throat having sufficient cross-sectional area to vent air trapped between the upper surface of the tire tread and the inner surface of the tread ring, in a preselected period of time sufficient to seat the outer surface of said tread against the inner surface of said tread ring, said arch-vent being in open communication with a horizontal parting line of the mold which is vented to the atmosphere.

2. The tire mold of claim 1 wherein said throat is near the mid-point of said arch-vent.

3. The tire mold of claim 2 wherein said arch-vent is narrower at said mid-point than at either end thereof, said wedge-shaped passages having generally flat sides, tapered inward to said throat.

4. The tire mold of claim 3 wherein each said wedge-shaped passage is no wider than about 2.54 mm at its widest point, and about 1.25 mm at the throat.

* * * * *

UNITED STATES PATENT AND TRADEMARK OFFICE
CERTIFICATE OF CORRECTION

PATENT NO. : 4,881,881

DATED : November 21, 1989

INVENTOR(S) : Rene L. Rockarts, Donald R. Bartley

It is certified that error appears in the above-identified patent and that said Letters Patent is hereby corrected as shown below:

IN COLUMN 10, LINE 56, "ar-vent" should read -- arch-vent --.

Signed and Sealed this

Thirtieth Day of October, 1990

Attest:

HARRY F. MANBECK, JR.

*Attesting Officer*   *Commissioner of Patents and Trademarks*